US012723151B2

(12) United States Patent
Goldbach et al.

(10) Patent No.: US 12,723,151 B2
(45) Date of Patent: Sep. 1, 2026

(54) PROCESSABLE TETRAFLUOROETHYLENE COPOLYMERS

(71) Applicant: Arkema Inc., King of Prussia, PA (US)

(72) Inventors: James T. Goldbach, King of Prussia, PA (US); Adam W. Hauser, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 776 days.

(21) Appl. No.: 18/018,294

(22) PCT Filed: Aug. 4, 2021

(86) PCT No.: PCT/US2021/044426
§ 371 (c)(1),
(2) Date: Jan. 27, 2023

(87) PCT Pub. No.: WO2022/031768
PCT Pub. Date: Feb. 10, 2022

(65) Prior Publication Data

US 2023/0257572 A1 Aug. 17, 2023

Related U.S. Application Data

(60) Provisional application No. 63/061,927, filed on Aug. 6, 2020.

(51) Int. Cl.

| | |
|---|---|
| ***C08L 27/18*** | (2006.01) |
| ***C08F 2/24*** | (2006.01) |
| ***C08F 14/26*** | (2006.01) |
| ***C08F 214/26*** | (2006.01) |
| ***C08L 27/16*** | (2006.01) |

(52) U.S. Cl.
CPC ................ *C08L 27/18* (2013.01); *C08F 2/24* (2013.01); *C08F 14/26* (2013.01); *C08F 214/262* (2013.01); *C08L 27/16* (2013.01)

(58) Field of Classification Search
CPC ...... C08L 27/18; C08L 27/16; C08F 214/262; C08F 2/24; C08F 14/26
See application file for complete search history.

(56) References Cited

U.S. PATENT DOCUMENTS

| | | | |
|---|---|---|---|
| 6,864,336 B2 | 3/2005 | Kaspar et al. | |
| 8,080,621 B2 | 12/2011 | Amin-Sanayei et al. | |
| 8,158,734 B2 | 4/2012 | Amin-Sanayei et al. | |
| 8,766,890 B2 | 7/2014 | Amin-Sanayei et al. | |
| 8,997,797 B2 | 4/2015 | Kitahara et al. | |
| 2005/0006811 A1 | 1/2005 | Blong | |
| 2006/0287409 A1* | 12/2006 | Mekhilef | C08J 9/36 522/150 |
| 2017/0088989 A1 | 3/2017 | Goldbach et al. | |

FOREIGN PATENT DOCUMENTS

| | | |
|---|---|---|
| DE | 3832828 A1 | 4/1990 |
| JP | 2004219579 A2 | 8/2004 |
| WO | WO2018063961 A1 | 4/2018 |
| WO | WO2018189091 A1 | 10/2018 |

OTHER PUBLICATIONS

Machine English translation of DE 3832828, Blickle et al., Apr. 12, 1990.*

Odian, George, Principles of Polymerization, Third Edition, John Wiley & Sons, Inc., 1991, pp. 19-24.*

Ebnesajjad et al; "12 Safety, Health, Environmental, Disposal, and Recycling"—Fluoropolymer Applications in the Chemical Processing Industries—http://dx.doi.org/10.1016/B978-0-323-4416-4.00012-9; Copyright 2018 Elsevier Inc. pp. 405-417.

Humphrey, J.S. et al; "Vinylidene Fluoride Polymers"; Encyclopedia of Polymer Science and Technology; Mar. 14, 2002; pp. 510-533.

* cited by examiner

*Primary Examiner* — Patrick D Niland
(74) *Attorney, Agent, or Firm* — Joanne Rossi

(57) ABSTRACT

A melt processable fluoropolymer composition comprising TFE, VDF and from 1 to 3 mol % fluorinated ether is disclosed. A method of making the polymer is also disclosed.

20 Claims, No Drawings

PROCESSABLE TETRAFLUOROETHYLENE COPOLYMERS

This application is a national stage application under 35 U.S.C. § 371 of PCT Application PCT/US2021/044426, filed Aug. 4, 2021; which claims benefit to U.S. Provisional application 63/061,927, filed Aug. 6, 2020; said applications herein incorporated by reference.

FIELD OF THE INVENTION

The present invention relates to a tetrafluoroethylene (TFE), vinylidene fluoride (VDF) and fluorinated ether copolymer. The composition can be processed by conventional means into wires, cables, films, and any other part or article made by a thermoplastic shaping process. The resulting articles have both high and low temperature resistance and are resistant to thermal stress cracking.

BACKGROUND

Thermoplastic polymers with both high and low temperature resistance along with high chemical and weathering resistance are desirable in several applications in, for example, wire and cable, film, coatings, battery separators or binders, and tubing. For applications where melt-processing is required, it is a large advantage if the processing temperature and viscosity fall within a reasonable range such that the materials can be processed by common and well-known methods such as extrusion (film, wire, etc.), injection molding, blow molding, and 3D printing. Poly(vinylidene fluoride) (PVDF) exhibits very good weathering and processability, but is limited in terms of low temperature and high temperature performance.

Poly(tetrafluoroethylene) (PTFE) and PTFE-based copolymers are known to have both high and low temperature performance, but often exhibit poor or difficult melt-processability. Furthermore, low molecular weight PTFE is known to fail (crack) when under mechanical stress and thermal stress simultaneously. There is a need for easily processable, high/low temperature resistant, and thermal stress crack resistant fluoropolymers Stress cracking is a phenomenon in polymeric materials where an external factor (solvent, heat, light, etc.) acting on said polymer can cause brittle failure at strains or stresses well below the yield point.

Document U.S. Pat. No. 3,235,537 discloses solid polymers consisting of 2-50 mol % perfluoroalkyl perfluorovinyl ether units, 10-85% VDF and 3-80% (—CFX—CFY—) repeat units for curable resins, but does not discuss viscosity or MW control, processing, or stress crack resistance.

Japanese Publication JP 2004-219579 to Mitsubishi Rayon teaches optical fibers and optical fiber cables having 1 to 30% by mass VDF, 30 to 85% TFE and 3 to 40% fluorovinyl compound represented by $CF_2$═CF—($OCF_2CF(CF_3)$)a-O—Rf2 and has a 1.335 to 1.370 refractive index. Rf2 is a C1 to C8 alkyl group, fluoroalkyl group, alkoxy alkyl group or fluoroalkoxy alkyl group and a is an integer of 0 to 3. The polymer is used as the outer coating of an optical fiber.

Document U.S. Pat. No. 8,997,797 discloses a fluororesin that includes TFE, VDF and another ethylenically unsaturated monomer that has a storage modulus between 60-400 MPa at 170° C. U.S. Pat. No. 8,997,797 requires a minimum quantity of TFE of 55 mol %.

SUMMARY OF THE INVENTION

The present invention relates to a tetrafluoroethylene (TFE), vinylidene fluoride (VDF) and fluorinated ether copolymer. Preferably the fluorinated ether is a perfluoroalkyl vinyl ether such as perfluoropropyl vinyl ether (PPVE). The composition can be processed by conventional means into wires, cables, films, and any other part or article made by a thermoplastic shaping process. The resulting articles have both high and low temperature resistance and are resistant to thermal stress cracking. The polymer of the invention has a high melting temperature (above 175 C) and low temperature impact resistance below −80 C.

The polymer comprises from 39.5-57.0 mol % TFE, 42.0-57.5 mol % VDF and from 1.0 to 3.0 mol % fluorinated vinyl ether. The polymer is melt processable and exhibits stress crack resistance as measured by melt rheology and the method as described herein, respectively.

ASPECTS OF THE INVENTION

Aspect 1 A fluoropolymer composition comprising 39.5-57.0 mol % TFE, 42.0-57.5 mol % VDF and 1.0-3.0 mol % fluorinated ether and wherein the composition is melt processable.

Aspect 2 The fluoropolymer composition of aspect 1 wherein the fluorinated ether is selected from the group consisting of perfluoromethyl vinyl ether (PMVE), perfluoroethyl vinyl ether (PEVE), perfluoro-n-propyl vinyl ether (PPVE), perfluoroisopropyl vinyl ether (PiPVE) and perfluoro-2-propoxypropyl vinyl ether.

Aspect 3 The fluoropolymer composition of aspect 1 wherein the ether comprises PPVE.

Aspect 4 The fluoropolymer of any one of aspects 1 to 3 wherein the fluoropolymer has no thermal stress cracking behavior up to 150° C. at strains up to 7%.

Aspect 5 The fluoropolymer of any one of aspects 1 to 4 wherein the fluoropolymer has a melt viscosity as measured at 260° C. at 100 $s^{-1}$ of from 1 to 20 kP, preferably from 5 to 19 kP.

Aspect 6 The fluoropolymer of any one of aspects 1 to 5 wherein the fluoropolymer has a melting point of from 170 to 220° C., preferably of from 180 to 210° C., more preferably 185 to 209° C.

Aspect 7 The fluoropolymer of any one of aspects 1 to 6 wherein the fluoropolymer has an impact resistance down to negative 80° C. of greater than 100 Jim as measured by izod impact testing, preferably greater than 250 J/m, more preferably greater than 500 J/m.

Aspect 8 The fluoropolymer of any one of aspects 1 to 7 wherein the fluoropolymer is melt processable via extrusion, injection molding, or compression molding.

Aspect 9 The fluoropolymer composition of aspect 1 comprising 51.7-56.0 mol % TFE, 42.5-45.5 mol % VDF and 1.5 to 2.8 mol % PPVE and wherein the melt viscosity is from 10 to 16 kP.

Aspect 10 A method of synthesizing a melt-processable fluoropolymer composition comprising the steps of providing TFE monomer, VDF monomer and fluorinated vinyl ether monomer, initiating the polymerization in the presence of a chain transfer agent, wherein the amount of CTA is from 0.01-0.5 mol %, preferably 0.01-0.4 mol %, and most preferably 0.01-0.3 mol % based on the total moles of monomer used in the polymerization process, said fluoropolymer composition comprising 39.5-57.0 mol % TFE, 42.0-57.5 mol % VDF and 1.0-3.0 mol % fluorinated vinyl ether.

Aspect 11 The method of aspect 10 wherein the polymerization is conducted in a pressure range of from 0.5 MPa to 5.0 MPa.

Aspect 12 The method of aspect 10 or 11 wherein the polymerization is conducted in a temperature range of from 25° C. to 125° C.

Aspect 13 The method of aspect 10 wherein the polymerization is conducted in a pressure range of from 0.5 MPa to 3.0 MPa.

Aspect 14 The method of aspect 10 or 13 wherein the polymerization is conducted in a temperature range of from 50° C. to 120° C.

Aspect 15 The method of any one of aspects 10 to 14 wherein the fluorinated ether is selected from the group consisting of perfluoromethyl vinyl ether (PMVE), perfluoroethyl vinyl ether (PEVE), perfluoro-n-propyl vinyl ether (PPVE), perfluoroisopropyl vinyl ether (PiPVE) and perfluoro-2-propoxypropyl vinyl ether.

Aspect 16 The method of any one of aspects 10 to 15 wherein the chain transfer agents ether is selected from the group consisting of oxygenated organic compounds such as alcohols, carbonates, ketones, esters, and ethers may serve as chain-transfer agents; halocarbons and hydrohalocarbons, such as chlorocarbons, hydrochlorocarbons, chlorofluorocarbons and hydrochlorofluorocarbons; ethane and propane Aspect 17 The method of any one of aspects 10 to 16 wherein the vinyl ether comprises PPVE and wherein the CTA comprises ethyl acetate in an amount of from 0.01-0.5 mol % based on the total moles of monomer.

Aspect 18 The method of aspect 10 wherein the amount of CTA is from 0.01 to 0.5 mol % based on the total moles of monomer used in the polymerization process, said fluoropolymer composition comprising 51.7-56.0 mol % TFE, 42.5-45.5 mol % VDF and from 1.5 to 2.8 mol % PPVE and the polymerization is conducted in a pressure range of from 0.5 MPa to 3.0 MPa and in a temperature range of from 50° C. to 120° C. and wherein the melt viscosity of said fluoropolymer is from 10 to 16 kP.

Aspect 19 An article of manufacture comprising the polymer of any one of aspects 1 to 9.

Aspect 20 The article of aspect 19 wherein the article is selected for the group consisting of wires, cables, greenhouse films, architectural film, coatings, battery binder, battery separator films or coatings, offshore pipes, dielectric films, piezoelectric films and sensors, pyroelectric films and sensors, chemical processing films, polymer processing aids and automotive tubing, preferably wires, cables.

DETAILED DESCRIPTION OF THE INVENTION

In the context of the present application, unless otherwise indicated, all viscosities are melt viscosities that are measured at a temperature of 260° C. and at a shear rate of 100 $s^{-1}$. More specifically, melt viscosities may be measured by a Dynisco LCR 7000 capillary rheometer. Measurements are performed at 260° C. at shear rates from 10 to 3000 $s^{-1}$, with the viscosity recorded at 100 $s^{-1}$ using ASTM method D-3835.

Differential scanning calorimetry (DSC) is used to determine melting point of the inventive polymer. The DSC is run with a heating/cooling rate of 10° C./min. The ΔH of formation is defined by integrating the endothermic area in the heat flow curve during the second heat ($T_m$) or exothermic area during the first cool ($T_c$) and dividing by the temperature ramp rate and sample mass using ASTM 3418.

Thermal stress cracking is performed by molding 3 mm thick rectangular strips of the copolymers, pre-soak at the test temperature for 30 min, impart stress by bending to a known radius, then visually checking for cracks at each time point. The failure is quantified by the fraction of parts that have cracked at a given time. The results reported here are reported as a simple pass or fail. A pass indicates that the polymer parts show no cracking after three days of testing, and a fail indicates that at least one part shows a crack within 3 days of testing. More specifically, the parts are molded to be 3 mm thick, 10 cm long, and 1 cm wide. The outer diameter of which they are wrapped for testing is 2 cm giving a calculated strain of 7% on the outer polymer surface, and the testing temperature was at 150° C.

The materials described herein are melt processable semicrystalline thermoplastic polymers. Melt processable herein means that the polymers can be melted shaped (through an extruder or injection molder, for example) and then cooled to provide a shaped article while retaining shape with no cracking. Additionally, herein a melt viscosity at or above 21 kP at 260° C. at 100 $s^{-1}$, as determined by capillary rheometry described above, is not melt processable.

Solid-state Fluorine NMR analysis is used to determine chemical composition. Using powder samples packed into 2.5 mm Bruker zirconia rotors, the $^{19}F$ solid-state spectra can be acquired on the Bruker AVIII 300 WB (7.05 T) spectrometer equipped with a 2.5 mm CP MAS probe at room temperature with a spinning speed of 30 kHz. In order to suppress background contributions, $^{19}F$ spectra of the empty rotors can be subtracted from the samples spectra.

The composition is a melt-processable fluoropolymer composition comprising 39.5-57.0 mol % TFE, 42.0-57.5 mol % VDF and 1.0-3.0 mol % fluorinated ether. When more than one ether is used, the total mol % ether present in the polymer is from 1 to 3 mol %. Preferably the ether comprises perfluoropropyl vinyl ether (PPVE).

Fluorinated ethers include but are not limited to, fluorinated or perfluorinated vinyl ethers such as perfluoromethyl vinyl ether (PMVE), perfluoroethyl vinyl ether (PEVE), perfluoro-n-propyl vinyl ether (PPVE), perfluoroisopropyl vinyl ether (PiPVE), perfluoro-2-propoxypropyl vinyl ether, perfluorobutylvinyl ether (PBVE), longer chain perfluorinated vinyl ethers and combinations thereof.

The fluorovinyl ether may preferably be represented by $CF_2{=}CF{-}(OCF_2CF(CF_3))a{-}O{-}R$. R is a C1 to C8 alkyl group, fluoroalkyl group, alkoxy alkyl group or fluoroalkoxy alkyl group and a is an integer of 0 to 3. The fluorovinyl ether may have one of the following formulas: $CF_2{=}CF{-}O{-}(CH_2)n{-}(CF_2)m{-}(CF_3)$ n, m are an integers of 0 to 3; $CF_2{=}CF{-}O{-}(CH_2)n{-}(CH_3)$ n is an integer of 0 to 3; $CF_2{=}CF{-}O{-}(CF_2)n{-}O{-}CF_3$, n is an integer of 0 to 3.

The inventive copolymer exhibits impact resistance of greater than 100 J/m, greater than 250 J/m, greater than 500 J/m at negative 80° C. as measured by izod impact testing ASTM D256.

The inventive copolymer exhibits stress crack resistance as determined by the method described herein.

The melting point of the inventive copolymers is between 170 to 220° C., preferably between 180 to 210° C. as determined by DSC.

The copolymer of the present invention is generally insoluble at ambient temperature in solvents that are generally used for PVDF copolymers. Such solvents include polar aprotic solvents such as dimethylsulfoxide, n-methylpyrrolidone (NMP), N,N'-dimethylformamide (DMF), N,N'-dimethylacetamide (DMAc), ketones such as acetone, methyl ethylketone (MEK), methyl isobutylketone (MIBK), and ethers such as tetrahydrofuran (THF) and methyl t-butylether (MTBE). The copolymer of the present invention is also generally insoluble in solvents that PVDF and PVDF copolymers are also insoluble in such as water and aqueous solutions, aliphatic alcohols, alkyl and aromatic hydrocarbon, and chlorinated aliphatic and aromatic solvents.

Polymerization

The TFE/VDF/Ether polymer of the invention is synthesized with 0.01-0.5 mol % based on the total moles of monomer chain transfer agent (CTA), relative to total monomer used in the polymerization. To obtain the polymer of the invention both a fluorinated ether and the presence of a CTA in the polymerization reaction are required. The polymer of the invention is melt processable and is stress crack resistant.

The copolymers are prepared in via emulsion or suspension polymerization as known in the art and described in U.S. Pat. No. 8,765,890B2 incorporated herein by reference. For emulsion polymerization a pressure range of 0.5 MPa to 5.0 MPa and a temperature range of 25° C. to 125° C. is often used with initiating systems consisting of inorganic peroxides, redox systems, and organic peroxides as known in the art. With the TFE/VDF comonomer pair as the majority components in the structure, the reactivity ratios are such that the monomers are distributed randomly throughout the resulting polymer backbone giving a homogeneous composition throughout the bulk of the material.

A general procedure that can be used for the polymerization reaction is: tetrafluoroethylene (TFE) is purified by passing through an activated carbon bed and mixed via recirculation in a holding tank with vinylidene fluoride (VDF) in the desired ratio. A reactor is charged with deionized water in the desired amount and surfactant. The water charge is deoxygenated by pressurization of the reactor with nitrogen, holding at the pressure (e.g. for at least 5 min) with agitation, then venting to 0 psig. This cycle can be repeated. The chain transfer agent (CTA) is injected to the reactor along with the prescribed amount of fluorinated ether. The reactor contents are agitated, heated and pressurized with the TFE/VDF mixture. Initiator is added to start the polymerization. TFE/VDF mixture is then added to maintain the pressure. Additional aliquots of initiator solution are added to maintain monomer uptake at the desired rate. Reaction is completed once the prescribed amount of TFE/VDF mixture has been added to the reaction, at which point, TFE/VDF mixture feed is stopped and pressure is allowed to decrease autogenously. The reaction is cooled to room temperature, vented and product discharged through the reactor bottom port. The solid content of the latex product is determined by drying a known mass of latex to constant weight then using the mass difference to calculate the percent solids of the latex product.

The inventive polymer is synthesized with 0.01-0.5 mol %, preferably 0.01-0.4 mol %, and most preferably 0.01-0.25 mol % based on the total moles of monomer of a suitable chain transfer agent. Chain-transfer agents are added to the polymerization to regulate the molecular weight of the product. They may be added to a polymerization in a single portion at the beginning of the reaction, or incrementally or continuously throughout the reaction. The amount and mode of addition of chain-transfer agent depend on the activity of the particular chain-transfer agent employed, and on the desired molecular weight of the polymer product. Examples of chain transfer agents useful in the present invention include, but are not limited to oxygenated organic compounds such as alcohols, carbonates, ketones, esters, and ethers may serve as chain-transfer agents; halocarbons and hydrohalocarbons, such as chlorocarbons, hydrochlorocarbons, chlorofluorocarbons and hydrochlorofluorocarbons; ethane and propane. Specific examples of the chain transfer agent(s) that can be used include, but are not limited to, hydrocarbons such as ethane, propane, butane, isopentane, n-hexane and cyclohexane; aromatic compounds such as toluene and xylene; ketones such as acetone; acetic acid esters such as ethyl acetate and butyl acetate; alcohols such as methanol and ethanol; mercaptans such as methyl mercaptan; and halogenated hydrocarbons such as carbon tetrachloride, chloroform, methylene chloride and methyl chloride, and polyacrylic acid.

In one embodiment, the melt-processable fluoropolymer composition comprising 39.5-57.0 mol % TFE, 42.0-57.5 mol % VDF and 1.0-3.0 mol % PPVE is synthesized using 0.01-0.5 mol % ethyl acetate (based on the total moles of monomer) as the chain transfer agent.

The polymerization can use fluorosurfactant or non-fluorinated surfactant as an emulsifier as well known in the art. (U.S. Pat. Nos. 8,080,621, 8,158,734 incorporated herein by reference)

Uses

The inventive polymer can be heat processed on normal processing equipment used to extrude or mold PVDF copolymers. The inventive polymer can be extruded or heat molded to any desired shape.

The applications for such a polymer could include jacketing for wires, cables, architectural films (greenhouse), coatings, battery binder, battery separator films or coatings, offshore pipes, dielectric films, piezoelectric films and sensors, pyroelectric films and sensors, chemical processing films, polymer processing aids, matrix for composites, and automotive tubing.

EXAMPLES

Procedure—Latex Synthesis in 10 L Reactor

The procedure below is written using poly(tetrafluoroethylene-co-vinylidene fluoride-co-perfluoropropyl vinyl ether) (p(TFE-VDF-PPVE)) as the model copolymer. One of ordinary skill in the art could use the examples below, and teachings of the application to extend the invention to other fluoropolymers of the invention. Table 1 shows reaction parameters for the Examples.

Tetrafluoroethylene (TFE) is purified by passing through an activated carbon bed and mixed via recirculation in a holding tank with vinylidene fluoride (VDF) in the prescribed ratio. A 10 L-volume autoclave equipped with internal cooling coils and mechanical agitation is charged with deionized water in the desired amount as well as 9.0 g of (surfactant) perfluoro (2,5-dimethyl-3,6-dioxanonanoic acid). This water charge is deoxygenated by pressurization of the reactor to 60 psig with ultra-pure nitrogen, holding at that pressure for 5 min with agitation, then venting to 0 psig. This cycle is repeated an additional 2 times. At that point the ethyl acetate (EA) chain transfer agent (CTA) is injected to the reactor along with the prescribed amount of perfluoropropyl vinyl ether (PPVE). The reactor contents are agitated, heated to 80 C and pressurized to 1.4 MPa with the TFE/VDF mixture. 1.0 g of an aqueous solution of 1.0% potassium persulfate and 1.0% dipotassium phosphate (KPS/K2HP) is added using a high-pressure syringe pump to start the polymerization. TFE/VDF mixture is then added in the same ratio as during pressurization to maintain the 1.4 MPa pressure. Additional aliquots of KPS/K2HP solution are added to maintain monomer uptake at a rate greater than 500 g/hr. The reaction is completed once the prescribed amount of TFE/VDF mixture has been added to the reactor, at which point, TFE/VDF mixture feed is stopped and pressure is allowed to decrease autogenously for 30 minutes. The reactor is cooled to room temperature, vented and product discharged through the reactor bottom port. The solid content of the latex product is determined by drying a known mass of latex to constant weight then using the mass difference to calculate the percent solids of the latex product.

Each run constitutes a single batch as described in the general procedure with the material quantities and process parameters as noted.

TABLE 1

Poly(TFE-VDF-PPVE) synthesis reaction conditions.

| Example # | Water (kg) | TFE (kg total) | VDF (kg total) | PPVE (g total) | CTA (g) | Initiator Solution total* (g) | Latex Solids (wt %) |
|---|---|---|---|---|---|---|---|
| Control 1 | 6.19 | 1.26 | 0.68 | 0 | 2.0 | 2.0 | 22.2 |
| Control 2 | 6.19 | 1.27 | 0.69 | 18 | 0 | 2.0 | 23.1 |
| Control 3 | 6.19 | 1.27 | 0.69 | 54 | 0 | 2.0 | 23.9 |
| Control 4 | 6.19 | 1.27 | 0.69 | 36 | 1.0 | 2.0 | n/a** |
| A | 6.39 | 1.24 | 0.67 | 54 | 2.0 | 2.5 | n/a** |
| B | 6.19 | 1.27 | 0.69 | 90 | 2.0 | 4.0 | 23.8 |
| C | 6.19 | 1.27 | 0.69 | 90 | 3.0 | 4.0 | 22.6 |
| D | 6.19 | 1.27 | 0.69 | 126 | 1.0 | 2.0 | 23.5 |

(*Initiator Solution = potassium persulfate 1%, together with dipotassium hydrogen phosphate 1% in water)
(†200 L reactor; 180 g surfactant)
(**n/a: no fluid latex recovered; coagulated)

Melting temperature and melt viscosity was measured as described above.

TABLE 2

| Run | TFE (mol %) | VDF (mol %) | PPVE (mol %) | CTA (mol %) | $T_{m, DSC}$ (° C.) | Processable | Melt viscosity (kP) |
|---|---|---|---|---|---|---|---|
| control 1 | 54.3 | 45.7 | 0 | 0.00 | 205 | No | 21 |
| control 2 | 54.3 | 45.4 | 0.3 | 0.00 | 199 | No | 24 |
| control 3 | 54.1 | 44.9 | 1.0 | 0.00 | 192 | No | 23 |
| control 4 | 54.3 | 45.1 | 0.6 | 0.056 | 201 | No | 24 |
| A | 54.1 | 44.9 | 1.0 | 0.111 | 201 | Yes | 12 |
| B | 54.3 | 44.1 | 1.6 | 0.111 | 199 | Yes | 11 |
| C | 54.3 | 44.1 | 1.6 | 0.167 | 198 | Yes | 7.3 |
| D | 54.3 | 43.4 | 2.3 | 0.056 | 190 | Yes | 14 |

Compositions with a melt viscosity of 21 or greater are not melt processable.

The invention claimed is:

1. A fluoropolymer composition comprising a copolymer comprising 39.5-57.0 mol % TFE, 42.0-57.5 mol % VDF and 1.0-3.0 mol % fluorinated ether, wherein the composition is melt processable.

2. The fluoropolymer composition of claim 1 wherein the fluorinated ether is selected from the group consisting of perfluoromethyl vinyl ether (PMVE), perfluoroethyl vinyl ether (PEVE), perfluoro-n-propyl vinyl ether (PPVE), perfluoroisopropyl vinyl ether (PiPVE) and perfluoro-2-propoxypropyl vinyl ether.

3. The fluoropolymer composition of claim 1 wherein the ether comprises PPVE.

4. The fluoropolymer of claim 1, wherein the fluoropolymer no thermal stress cracking behavior up to 150° C. at strains up to 7%.

5. The fluoropolymer of claim 1, wherein the fluoropolymer has a melt viscosity as measured at 260° C. at 100 $s^{-1}$ of from 1 to 20 kP.

6. The fluoropolymer of claim 1, wherein the fluoropolymer has a melting point of from 170 to 220° C.

7. The fluoropolymer of claim 1, wherein the fluoropolymer has an impact resistance down to negative 80° C. of greater than 100 J/m as measured by izod impact testing.

8. The fluoropolymer of claim 1, wherein the fluoropolymer is melt processable via extrusion, injection molding, or compression molding.

9. The fluoropolymer composition of claim 1 comprising 51.7-56.0 mol % TFE, 42.5-45.5 mol % VDF and 1.5 to 2.8 mol % PPVE and wherein the melt viscosity is from 10 to 16 kP.

10. A method of synthesizing a melt-processable fluoropolymer composition comprising the steps of providing TFE monomer, VDF monomer and fluorinated vinyl ether monomer, initiating the polymerization in the presence of a chain transfer agent, wherein the amount of CTA is from 0.01-0.5 mol % based on the total moles of monomer used in the polymerization process, said fluoropolymer composition comprising 39.5-57 mol % TFE, 42-57.5 mol % VDF and 1-3 mol % fluorinated vinyl ether.

11. The method of claim 10 wherein the polymerization is conducted in a pressure range of from 0.5 MPa to 5.0 MPa.

12. The method of claim 11 wherein the polymerization is conducted in a temperature range of from 25° C. to 125° C.

13. The method of claim 10 wherein the polymerization is conducted in a pressure range of from 0.5 MPa to 3.0 MPa.

14. The method of claim 13 wherein the polymerization is conducted in a temperature range of from 50° C. to 120° C.

15. The method of claim 10 wherein the fluorinated ether is selected from the group consisting of perfluoromethyl vinyl ether (PMVE), perfluoroethyl vinyl ether (PEVE), perfluoro-n-propyl vinyl ether (PPVE), perfluoroisopropyl vinyl ether (PiPVE) and perfluoro-2-propoxypropyl vinyl ether.

16. The method of claim 10 wherein the chain transfer agent is selected from the group consisting of oxygenated organic compounds; halocarbons, hydrohalocarbons; ethane and propane.

17. The method of claim 10 wherein the vinyl ether comprises PPVE and wherein the CTA comprises ethyl acetate in an amount of from 0.01-0.5 mol % based on the total moles of monomer.

18. The method of claim 10 wherein the amount of CTA is from 0.01-0.5 mol % based on the total moles of monomer used in the polymerization process, said fluoropolymer composition comprising 51.7-56.0 mol % TFE, 42.5-45.5 mol % VDF and from 1.5 to 2.8 mol % PPVE and the polymerization is conducted in a pressure range of from 0.5 MPa to 3.0 MPa and in a temperature range of from 50° C. to 120° C. and wherein the melt viscosity of said fluoropolymer is from 10 to 16 kP.

19. An article of manufacture comprising the polymer of claim 1.

20. The article of claim 19 wherein the article is selected for the group consisting of wires, cables, greenhouse films, architectural film, coatings, battery binder, battery separator films or coatings, offshore pipes, dielectric films, piezoelectric films and sensors, pyroelectric films and sensors, chemical processing films, polymer processing aids and automotive tubing.

* * * * *